March 22, 1949.  A. HANSEN, JR  2,464,807
HALL EFFECT CONVERTER
Filed Aug. 16, 1947  2 Sheets-Sheet 1

Inventor:
Albert Hansen, Jr.,
by *Bronell S. Mack*
His Attorney.

March 22, 1949.    A. HANSEN, JR    2,464,807
HALL EFFECT CONVERTER
Filed Aug. 16, 1947    2 Sheets-Sheet 2

Inventor:
Albert Hansen, Jr.,
by Prowell P. Mack
His Attorney.

Patented Mar. 22, 1949

2,464,807

UNITED STATES PATENT OFFICE 2,464,807

HALL EFFECT CONVERTER

Albert Hansen, Jr., Nahant, Mass., assignor to General Electric Company, a corporation of New York Application August 16, 1947, Serial No. 768,982

7 Claims. (Cl. 175—363)

My invention relates to apparatus for converting low level direct current into alternating current having sufficient magnitude to operate phase sensitive amplifiers such as are employed in the operation of self-balancing recorders, potentiometric controllers, and the like. In carrying my invention into effect, I employ a converter employing the Hall effect and I prefer to employ a Hall effect unit made of germanium, which I have discovered has an exceptionally high Hall coefficient when properly prepared and has physical properties which make its use practicable for the purpose in question. A converter constructed in accordance with my invention employs no moving parts in the converter unit, is rugged in construction, low in cost, and has a sensitivity and stability which make it far superior to any D.-C. to A.-C. converter of its class heretofore available.

Figure 1:
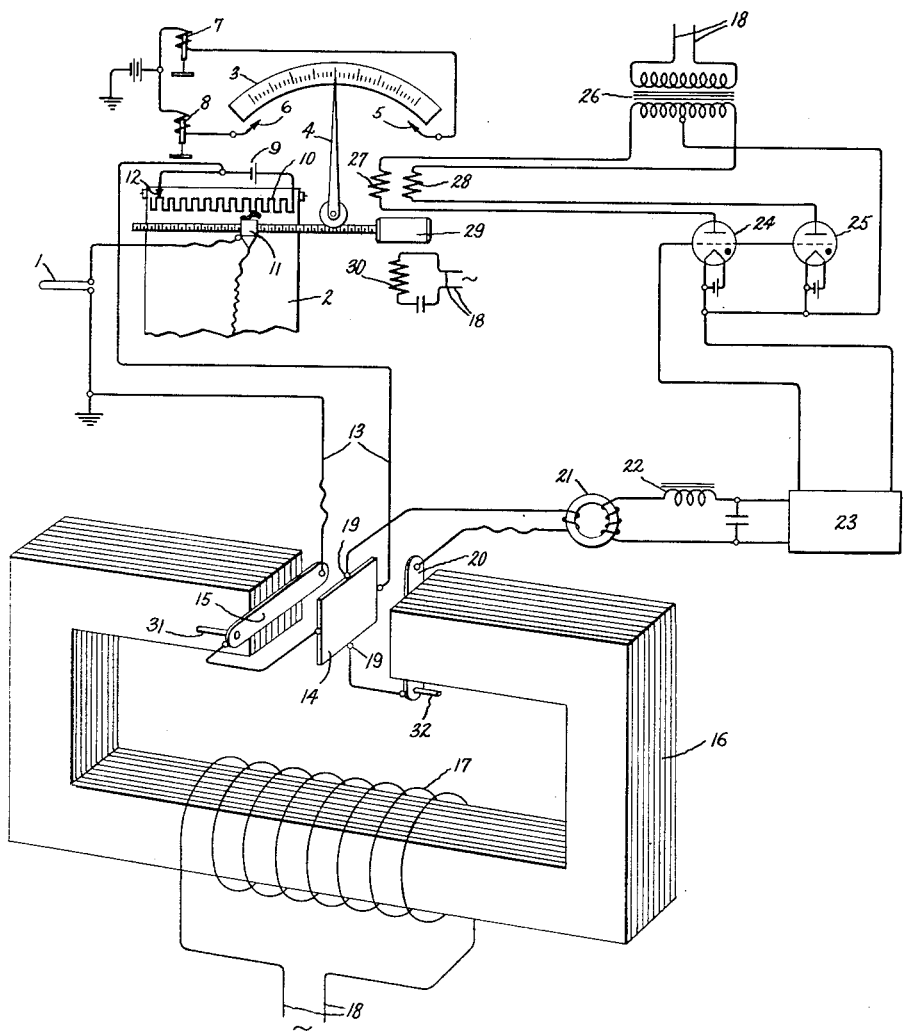
Figure 2:
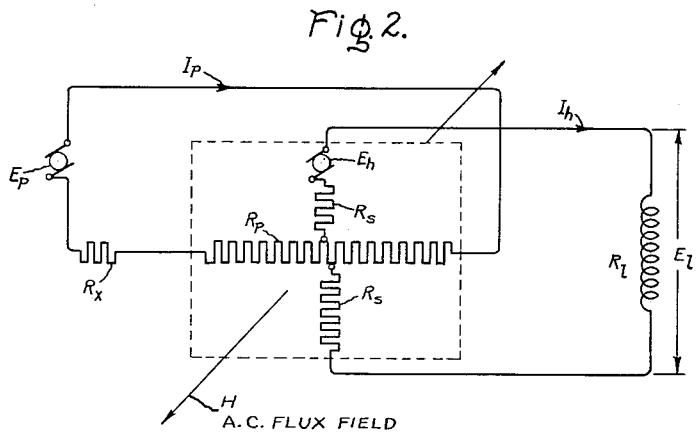
Figure 3:
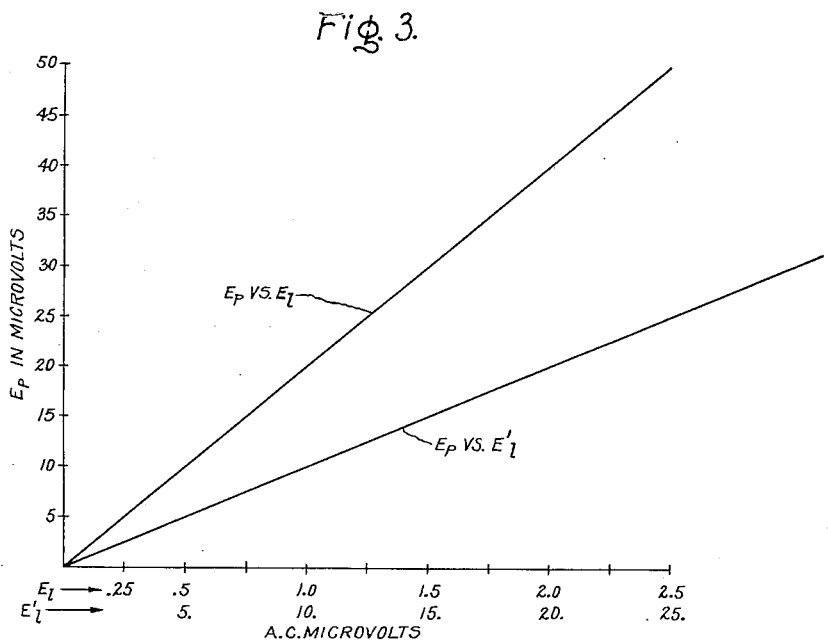

The features of my invention which are believed to be novel and patentable will be pointed out in the claims appended hereto. For a better understanding of my invention reference is made in the following description to the accompanying drawing illustrating in Fig. 1 my converter as applied to a combination recorder, indicator and controller responsive to the temperature of a thermocouple. Fig. 2 is a schematic diagram explanatory of the circuit impedance of a Hall plate and Fig. 3 are characteristic input output voltage curves of a practicable Hall converter. Fig. 1 of the drawing represents a thermocouple responsive to a temperature to be measured. The temperature is recorded on a chart 2 and indicated on a scale 3 by a pointer 4 which may cooperate with high and low limit contacts 5 and 6 for temperature control purposes by means of relays 7 and 8.

The voltage of thermocouple 1 is compared to that of a standard voltage furnished by a battery 9 by means of a resistance potentiometer 10 having a null type control effected by a sliding contact 11 and recorder element connected to one side of the thermocouple 1. The contactor 12 leading to one side of the battery 9 may be adjustable for calibration purposes. The difference in voltage, if any, of the thermocouple 1 and that portion of the standardized voltage drop of the slide wire to which it is compared is conveyed to the primary leads 13 of a Hall effect plate 14 by way of a movable conductor 15 located in the field of the Hall effect converter.

The converter unit comprises the laminated magnetic field core 16 energized by a coil 17 from a constant voltage, constant frequency source 18 such, for example, as 110 volts, 60 cycles. The field core contains an air gap in which is placed the germanium or other Hall effect plate 14 such that the A.-C. field produced across such gap passes through the thin dimension of the plate 14 at right angles to such plate. In a practicable example the plate 14 may be 14.2 millimeters long in the horizontal direction, as represented, and 6.4 millimeters high, although these dimensions are not especially important. The plate, however, should have sufficient dimensions in the above respects as to be easily handled and to enable the connections thereto to be readily made. The plate has a thickness preferably less than $\frac{1}{8}$ inch because the Hall effect voltage produced across the secondary for a given strength of field and primary current is inversely proportional to the thickness of the plate 14. The plate should, however, be sufficiently thick as to have the necessary mechanical strength to prevent easy breaking during construction and use. For the practicable example given the Hall plate may be 2.81 millimeters thick. Germanium is a semiconductor, is extremely hard, can be polished to a high luster, and is quite brittle. A diamond saw is used to shape the plate used. Germanium is made from germanium oxide. A constant alternating peak field intensity through the plate 14 of the order of 8000 gauss is recommended. If saturation is allowed to occur in the magnetic circuit, a third harmonic component appears in the output, which is generally undesirable.

Briefly, the Hall effect is the property of the material of plate 14 to generate a voltage across the secondary or output terminals 19 in one axis in the plane of the plate when a current flows through the plate in a direction at right angles to the axis of the output terminals and in the plane of the plate when the plate is placed in a magnetic field as shown, such that the flux passes through the thin dimension of the plate. Thus there is an output voltage produced across terminals 19 when a current flows in the plate by way of the input or primary terminals 13. The direction or polarity of the output voltage depends upon the direction of primary current flow and direction of the field flux. The input and output terminals should be connected at opposite edges of the plate along center lines at right angles to each other.

In this case, since the input current is a reversible direct current and the field is alternating, the output voltage is alternating and will reverse in phase by 180 degrees when the direction of the direct current primary current is reversed. Also, within the limits of useful converter operation, the output voltage is linearly proportional to the input current assuming a constant A.-C. field.

If the output terminals 19 be connected in an output circuit, a useful alternating current can be made to flow therein from the voltage generated. In the illustration the output circuit includes a movable conductor 20 and the primary of a toroid core distributed winding transformer 21. The voltage of this circuit is stepped up by the transformer 21, is filtered by a filter at 22, is amplified by a suitable vacuum tube amplifier indicated at 23 and applied to the grids of gas-filled power tubes 24 and 25. The tubes 24 and 25 are supplied from the two halves of the secondary of a transformer 26 by way of reversing windings 27 and 28 of an alternating current motor 29. Thus the cathodes of the power tubes 24 and 25 are connected to the midpoint of the secondary winding of transformer 26. The plate of tube 24 is connected through motor winding 27 to the left end of such secondary winding, and the plate of tube 25 is connected to the right end of such secondary winding through motor winding 28. This arrangement makes the operation of the tubes sensitive to the phase relation between such supply voltage and the control voltage applied to their grids from converter plate 14. The motor 29 is represented as the split phase type having a condenser winding 30 constantly supplied from the same A.-C. source 18 as supplies winding 17 of the converter and transformer 26. The source 18 may be a 110-volt, 60-cycle source.

It will now be seen that when the voltage of thermocouple 1 exceeds the voltage of that portion of the potentiometer 10 across which the thermocouple is connected, direct current will flow in one direction through the Hall effect plate 14, an A.-C. voltage of a given phase relation relative to source 18 will be generated and after being stepped up, filtered and amplified at 21, 22 and 23, will be impressed upon the grids of tubes 24 and 25. One of the tubes, say tube 24, will have its plate positive when its grid is positive for this condition and will pass half-cycle current pulses through winding 27. Tube 25 will not pass current at this time because its plate is positive when its grid is negative. Motor windings 27 and 30 will then be energized with effective alternating currents having approximately a 90-degree phase relation and will cause the motor to run in a direction to move slider 11 to the right and increase that portion of the voltage of battery 9 which is connected across thermocouple 1 and plate 14 in series until a balanced condition is reached and current no longer flows in the primary input circuit of the Hall converter. When this happens, tube 24 will cease to pass pulses and motor 29 will stop. The slider 11 has a recording stylus on its rear side which records its position and the temperature of thermocouple 1 on record sheet 2. Also, motor 29 drives a pointer 4 over a scale 3 to indicate the temperature of thermocouple 1. Upon an increasing temperature as assumed above, the slider 11 and pointer 4 will be arranged to move to the right.

Now assume that the temperature of the thermocouple 1 decreases. This passes a current of polarity, opposite to that previously assumed, through the Hall plate 14 through primary leads 13. The Hall converter then has an A.-C. output of a phase relation 180 degrees from that which it had previously. Now tube 25 passes current pulses because its plate is positive when its grid is positive, whereas tube 24 is idle since now its grid is positive when its plate is negative. Windings 28 and 30 of the motor 29 will now be energized and the motor with reversed rotation will drive slider 11 and pointer 4 to the left until the voltage impressed upon the input circuit of the Hall converter is again zero, whereupon the motor 29 will stop. In case of predetermined high or low temperatures contacts 5 or 6 will be closed to operate control relays 7 or 8 assumed to be arranged for control of the temperature of thermocouple 1.

That portion of the apparatus described, other than the Hall converter, is not new and may vary considerably from that illustrated. The Hall converter as herein described and its use in such a control system are believed to be new. The output of the Hall converter is proportional to its input voltage from the potentiometer and the magnitude of the current pulses produced by tubes 24 and 25, and hence, the speed of operation of motor 29 is proportional to out-of-balance condition of the potentiometer. I have found that the Hall converter is effective over an input voltage range from $0.05 \times 10^{-6}$ volts to an upper limit fixed by self-heating (approx. 3.2 volts) in a typical case. The lower limit corresponds to that of the noise level of the tubes used in the amplifier at 23. The relation between input and output voltages is of the order of 20 to 1. I found this to be no handicap because the characteristic impedance of the output is so low that a step up transformer can readily be used without raising the impedance to a point where electrostatic pick up is bothersome. The transformer, however, for step up and filtering should be carefully constructed. I have found that a toroid core transformer with distributed windings to be satisfactory. While a thermocouple 1 and standard voltage have been illustrated as comprising the source of input voltage, it will be evident that any source of small direct current voltage or current, reversible or otherwise, may be converted to a proportional alternating current by means of my converter.

I now wish to explain the purpose of the movable conductors 15 and 20 in the primary and secondary circuits of the converter. It will be noted that conductor 15 is pivoted at 31 and as positioned lies across the center of the alternating flux field produced in the core 16. Hence, current flowing in such conductor in the primary circuit crosses the center of the field in one direction and flows in the reverse direction across the center of such field when flowing through the Hall plate 14. Hence, as the conductor 15 is positioned, no effective alternating flux links the primary circuit. However, if the conductor 15 be raised and turned on pivot 31 to an upright position, the primary circuit will have one-half turn linked by the A.-C. flux in a given direction, whereas if the conductor 15 be turned downward from the position shown to a vertical position, the primary circuit will have one-half turn linked with the alternating flux in the opposite direction. Thus, I have provided means for varying the linkage of the primary circuit with the A.-C. flux of the converter by one-half turn in either direction. In addition it is readily possible to increase this linkage by one or more full turns in either direction by simply winding one of the leads 13 about the core 16, but it is generally unnecessary for present purposes. The purpose of movable conductor 15 is to balance out pickup in the primary circuit which, due to rectifier action of the field, will show up as a double frequency in the output circuit and on the input to amplifier 23 if it is not balanced out. By movement of conductor 15, generally less than the maximum amount, in one direction or the other from the midposition shown, any pickup in the input circuit can be balanced out and ceases to be bothersome. The movable conductor 20 pivoted at 32 is similarly arranged with respect to and in the output circuit of the converter, and its purpose is to balance out any unwanted fundamental frequency pickup. These pickup eliminators may be adjusted by connecting an oscillograph across the output of the amplifier 23 and adjusting the conductors 15 and 20 when there is no direct current flowing in the primary input circuit until no double frequency or fundamental frequency signal is detected.

The extent to which a material will exhibit the Hall effect is known as the Hall constant and may be expressed thus:

$$K_h = \frac{E_h D}{H I_p} \times 10^{-9}$$

where $E_h$ = output voltage in volts.
$D$ = thickness of the Hall plate 14 in centimeters.
$H$ = field strength in gausses, and
$I_p$ = input current in amperes.

I have used germanium Hall plates having a Hall constant of from 100,000 to 300,000. The Hall constant of the plate referred to in the example of Fig. 1 was 156,000. The indications are that such constant varies in different samples depending largely upon its preparation. The useful output of a Hall effect unit depends also on the resistance to current flow therethrough and the effect of impedance which necessarily exists in the output circuit. To assist in visualizing the factors involved I have in Fig. 2 represented a Hall plate converter circuit where the Hall plate 14 is represented in dotted outline with resistances $R_p$ and $R_s$ indicating its primary and secondary internal circuit impedances. The primary circuit is energized from a voltage $E_p$ through a circuit leaving resistance $R_x$ external to the Hall plate and causes a primary current $I_p$ to flow in such circuit. In the ideal case the center of resistance in the Hall plate of the primary and secondary circuits should coincide. Actually they may not coincide exactly and, hence, the opposite halves of resistance $R_s$ is shown joined to the resistance $P_p$ at two points slightly spaced from its center. The Hall voltage produced across the plate is represented as a D.-C. generator designated $E_h$. The output or secondary circuit contains impedance $R_1$ external to the Hall plate and may represent the load across which a voltage $E_1$ is produced by the secondary current $I_h$.

The current output of a Hall effect unit derived by Lorentz (Verse. Kon. Akad. Amst. (2), 19, p. 217, 1884) may be expressed as follows:

$$I_h = \frac{K_h H E_p}{d(R_x + R_p)(R_1 + R_s)} \times 10^{-9}$$

Where as represented in Fig. 2, $E_p$ = voltage of primary circuit
$I_p$ = current of primary circuit
$R_x$ = external resistance of primary circuit
$R_p$ = resistance of Hall plate in primary circuit
$E_h$ = Hall effect voltage
$I_h$ = Hall effect current in output circuit
$R_s$ = Resistance of Hall plate in output circuit
$R_1$ = External resistance in output circuit The external resistance $R_x$ in the primary circuit can be neglected.

The above expression can be rewritten as the potential $E_1$ across the output load as follows:

$$E_1 = \frac{K_h H I_p R_1}{d(R_1 + R_s)} \times 10^{-9}$$

The practicable application of the Hall effect depends on two properties of any material in addition to physical limitations (stability, care of handling, etc.). These two properties are the Hall coefficient and the resistivity, and their relative magnitude in any specimen. The ratio of Hall coefficient to resistivity is a measure of electron activity.

$$E_h = \frac{K_h}{R}$$

where $E_h$ = electron activity
$K_h$ = Hall constant, and
$R$ = resistivity of the plate used in ohms per centimeter Tabulated is the approximate $K_h$, $R$, and $E_h$ of some standard conductors and those exhibiting high $E_{h_1}$.

| Material | $K_h$ | R | $E_h$ |
|---|---|---|---|
| Germanium | +100,000 | 10 | 0.1 |
| Bismuth | +10 | .0001 | 1.0 |
| Tellurium | +700 | .2 | .035 |
| Silver | $-8.3 \times 10^{-4}$ | $1.63 \times 10^{-6}$ | .05 |
| Gold | $-7. \times 10^{-4}$ | $2.44 \times 10^{-6}$ | .03 |
| Copper | $-5.47 \times 10^{-4}$ | $1.7 \times 10^{-6}$ | .035 |
| Tin | +0.2 | $41 \times 10^{-6}$ | .05 |

It will be noted that bismuth has a higher $E_h$ than the sample of germanium by a factor of 10. If the application was one in which the load was zero (potentiometric or vacuum tube input), a bismuth unit would be best, except for the fact that a bismuth unit would not (at present) be a practical unit to construct or use, as the specimen would be extremely thin and fragile. Germanium, on the other hand, can be of large cross section and is easy to handle, as leads can be attached by tin soldering. The expression for voltage gain is derived as follows:

$$E_h = \frac{K_h H I_p}{d} \times 10^{-9}$$

$$E_p = I_p R_p = I_p R \frac{l}{wd}$$

$$\text{Voltage gain} = \frac{E_h}{E_p} = \frac{K_h H I_p}{d I_p R \frac{l}{wd}} \times 10^{-9} = \frac{K_h H w \times 10^{-9}}{Rl}$$

Where $l$ = length and $w$ = width of the Hall plate or $$\frac{E_h}{E_p} = E_h \frac{Hw}{l} \times 10^{-9}$$

On the other hand, if the application is one where some power is to be delivered, the higher Hall coefficient is best as per the following derivation:

$$\text{Secondary power} = P_s = \frac{E_h^2}{R_s + R_1} = \frac{K_h^2 H^2 I_p^2}{d^2(R_s + R_1)} \times 10^{-18}$$

$$\text{Primary power} = P_p = I_p^2 R_p$$

$$\text{Power gain} = \frac{P_s}{P_p} = \frac{K_h^2 H^2}{d^2 R_p (R_s + R_1)} \times 10^{-18}$$

but $$R_p = \frac{Rl}{wd}$$

$$\frac{P_s}{P_p} = \frac{K_1{}^2H^2}{Rl\frac{d}{w}(R_s+R_1)} \times 10^{-18}$$

I have also found that the Hall effect is proportional to the magnetic field intensity, that the maximum power delivered occurs when the internal impedance matches the external load, and that with an increasing load the increased power comes from the primary circuit. With respect to germanium, the resistance increases with magnetic field intensity and tends to decrease with a temperature rise. Also, the Hall coefficient tends to decrease slightly with temperature rise. These characteristics are, however, not such as to interfere with the use of germanium as a converter.

The curves of Fig. 3 show typical useful low range input and output voltages at characteristic impedances in a practicable germanium converter embodying my invention, employing a 60-cycle field flux of the order of 8000 gauss peak value. The curves of Fig. 3 correspond to a primary circuit impedance of 80 ohms, an output circuit impedance of 50 ohms, and a load impedance on the secondary side of the step-up transformer 21 of Fig. 2 of 5000 ohms. $E_p$ is primary input volts, $E_1$ secondary output load volts, and $E'_1$ the voltage on the secondary side of a 10-to-1 step-up toroid core distributed winding transformer such as represented at 21 in Fig. 1. Such curves are produced by a germanium Hall plate having a length of 14.2 millimeters, a width of 6.4 millimeters, a thickness of 2.81 millimeters, a Hall coefficient of 156,000, and a resistivity of 11 ohms per centimeter. While there is a linear relation between input and output voltages, it will be evident that while this is a desirable characteristic, it is not essential to a converter employed in a null type of control system. The A.-C. output for D.-C. input will be phase related to the A.-C. field excitation. A change in D.-C. polarity results in a 180-degree phase reversal of output with respect to excitation.

What I claim as new and desire to secure by Letters Patent of the United States is:

1. A Hall effect converter comprising a Hall plate, a circuit for supplying said plate with primary input direct current through one axis in its plane, and output secondary circuit connected to be supplied by said Hall plate through an axis at right angles to the previously mentioned axis in its plane, and means for producing a substantially constant alternating flux field through said plate at right angles to its plane.

2. A Hall effect converter comprising a Hall plate made of germanium not more than $\frac{1}{16}$ inch in thickness, primary direct current input terminals at opposite edges of the plate, secondary alternating current terminals at opposite edges of the plate on a line at right angles to the line of input terminals, and means for producing an alternating current field through the thin dimension of said plate having a peak strength of the order of 8000 gauss.

3. A Hall effect converter comprising a Hall effect plate having a Hall constant between 100,000 and 300,000 and a ratio of Hall constant to resistivity of not less than 0.04 and a thickness of not greater than $\frac{1}{16}$ inch, primary direct current input terminals connected at opposite edges of said plate along one center line, secondary alternating current output terminals connected at opposite edges of said plate along a center line at right angles to the first-mentioned center line, an alternating current electromagnet containing an air gap in which said Hall plate is located in a plane at approximately right angles to the flux axis, said electromagnet being designed for operation below saturation and for producing a flux field through the plate of the order of 8000 gauss peak value.

4. A Hall converter comprising a rectangular plate of germanium not over $\frac{1}{16}$ inch in thickness, 16 millimeters in length and eight millimeters in width, primary direct current input terminals at the centers of opposite ends of said plate, alternating current output terminals at the centers of opposite width sides of said plate, and means for producing a constant alternating flux through the thin dimension of said plate of the order of 8000 gauss peak value.

5. A Hall converter comprising a plate of Hall effect material, a direct current primary input circuit connected across opposite edges of said plate, an alternating current output circuit connected across opposite edges of said plate on a line at right angles to the line of input terminals, an alternating current electromagnet for producing an alternating flux field through the thin dimension of said plate, and means for balancing out pickup in the primary circuit due to rectifier action of the field comprising means for varying the direction and extent to which said field links the direct current primary input circuit.

6. A Hall effect converter comprising a Hall effect plate, a direct current primary input circuit connected across opposite edges of said plate, an alternating current secondary output circuit connected across opposite edges of said plate on a line at right angles to the line of primary circuit connections, an alternating current electromagnet for producing an alternating flux field of a given frequency through the thin dimension of said plate, and means for balancing out of the secondary output circuit any unwanted pickup of such frequency comprising means for varying the extent and direction in which said secondary circuit links the alternating flux field of said converter.

7. A Hall effect converter comprising a Hall plate having a direct current primary input circuit, an alternating current secondary output circuit and an alternating current electromagnet for producing an alternating field through said plate, a toroid core distributed winding step-up transformer having its primary connected across the alternating current output circuit of said Hall plate, a phase sensitive power amplifier controlled by the output of said transformer, and a common source of alternating current supply for said electromagnet and said power amplifier whereby said power amplifier is selectively responsive to the direction of direct current input to said Hall plate.

ALBERT HANSEN, Jr.

No references cited.